Patented May 2, 1944

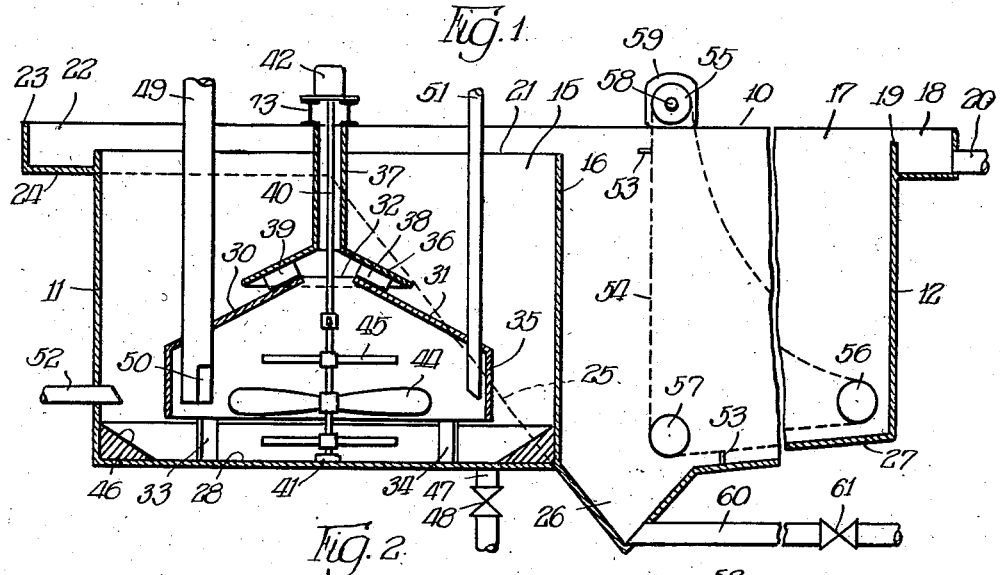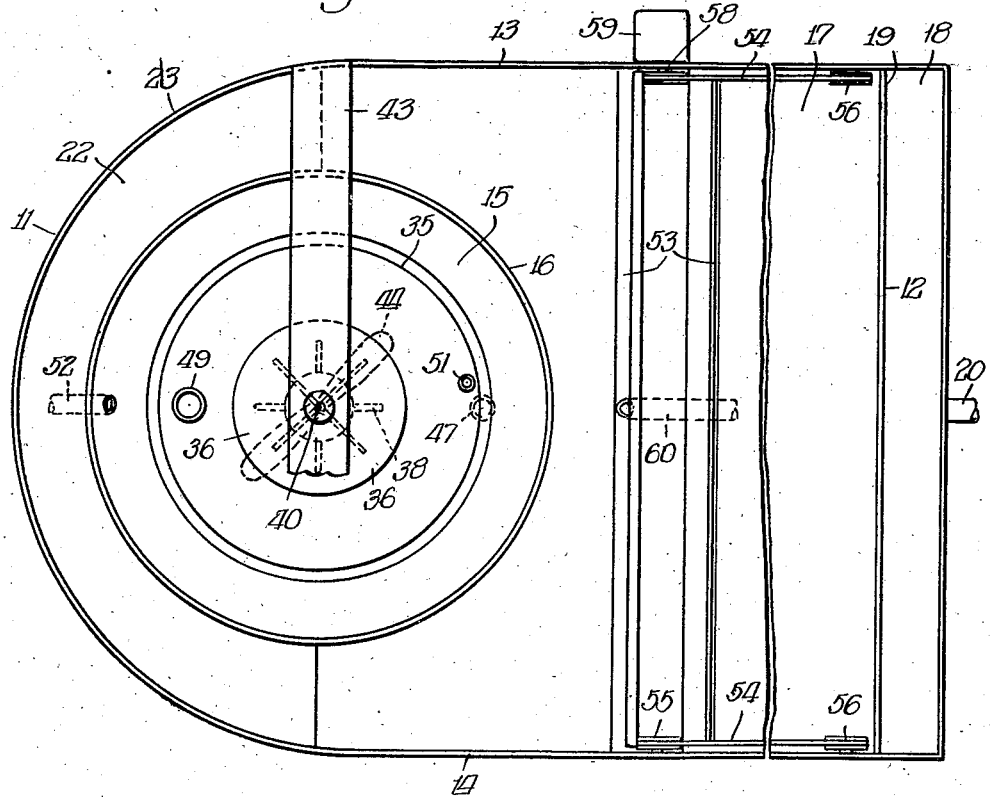

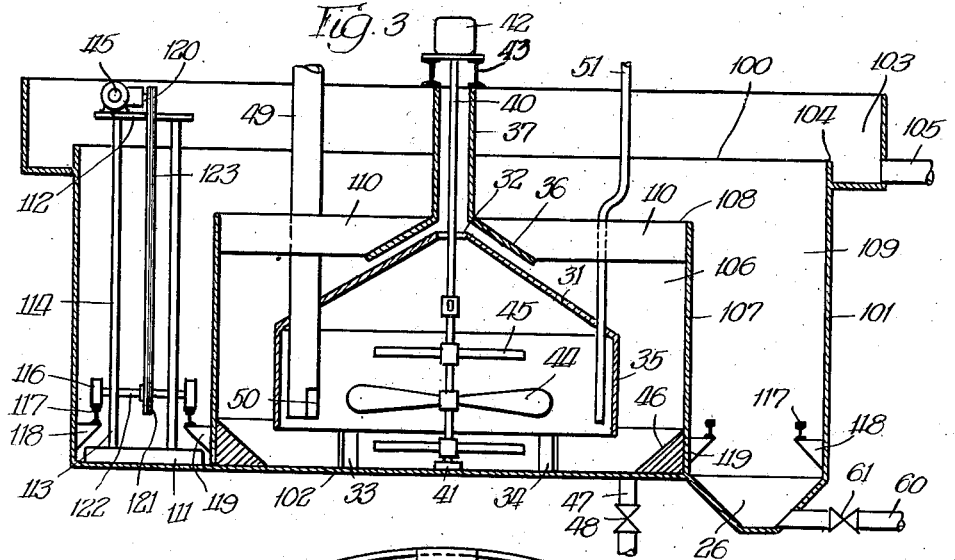
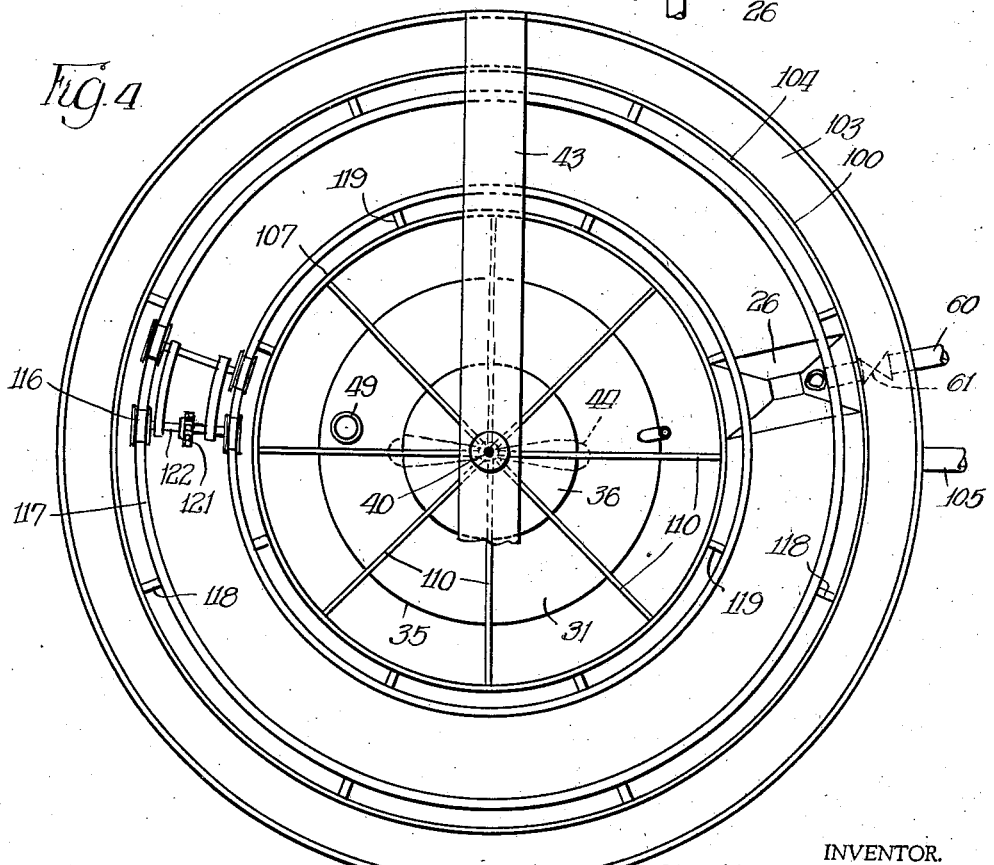

2,348,124

UNITED STATES PATENT OFFICE 2,348,124

LIQUID TREATMENT

Walter H. Green, Chicago, Ill., assignor to Infilco Incorporated, a corporation of Delaware Continuation of application Serial No. 301,695, October 28, 1939. This application June 6, 1941, Serial No. 396,881

10 Claims. (Cl. 210—16)

This invention relates to the treatment of liquid, and has particular reference to an improved method and apparatus for the treatment of liquid to remove undesirable substances therefrom, the present application constituting a continuation of my co-pending application, Serial No. 301,695.

One of the principal objects of the invention is to provide an improved method and apparatus for the treatment of liquid to remove dissolved, suspended or colloidal matter therefrom.

An object of the invention is to provide an improved process and apparatus for the purification of water by a process wherein the solids are formed in such a manner as to condition them to provide particularly tough, dense particles which are then passed with the water into an adjacent sedimentation zone and there sedimented from the water.

Still another object of the invention is the provision of a process and apparatus by which water may be treated by a precipitation process and the newly formed solids removed in a more rapid manner than has heretofore been possible.

Another and important object of this invention is to provide an improved process and apparatus for the treatment of water by a solids forming reagent, followed by sedimentation.

A still further specific object of this invention is to provide an improved process and apparatus for more rapidly forming precipitates in raw water, and for the rapid sedimentation of such precipitates.

A further object of the invention is to provide for the softening, clarification, stabilization, or purification of water with a precipitate forming reagent in the presence of a large quantity of dense slurry containing previously formed precipitate in order to effect the treating reaction in the presence of the previously formed precipitate, thereby expediting the reaction between the precipitate forming reagent and the impurities in the water, flowing the water into a sedimentation zone and separating the precipitated solids from the water therein.

Another object of the invention is the provision of a process and apparatus for the purification of water involving the maintenance of a dense slurry consisting of suspended particles previously separated from water, the addition of the treating reagent to raw water in the presence of a major portion of such slurry and the separation of the precipitated solids from water in an adjacent sedimentation zone.

A still further object of the invention is to provide an improved method for the formation of particles in water and the sedimentation of such particles therefrom, which comprises the treating of the raw water with a reagent in the presence of a dense slurry of previously precipitated particles in a zone of turbulent agitation, followed by flowing the water and suspended solids into a quiescent sedimentation zone whereby the size of the apparatus and the time required for treatment are materially reduced.

These and other objects will be apparent from a consideration of the specification and the claims which follow.

For many years the old art has taught the necessity for gentle agitation in the "flocculation" or "coagulation" steps when clarifying a turbid water or softening a hard water by the lime-soda process, followed by a prolonged holding in a quiescent sedimentation chamber. For example, in the removal of turbidity imparting solids from water the coagulating or flocculating steps customarily allowed from fifteen to sixty minutes of very gentle agitation, followed by two to four hours of settling.

The agitation has been generally applied in the flocculating zone by means of paddles moving through the water and good flocculation practice requires paddle speeds not exceeding two and one-half feet per second, and usually one and one-half to two feet per second is used. The object is to provide agitation to induce collision between the newly formed floc and turbidity imparting solids in order to aggregate minute particles into larger aggregates which will settle more readily. It has been found necessary to avoid higher speeds than these as more turbulent agitation caused disintegration of the particles. The particles formed by this method are sometimes large, but are light and very delicate. It is, therefore, very necessary to avoid turbulence in any part of the apparatus and it is necessary to provide relatively large sedimentation chambers. The usual sedimentation chamber or clarifier is made sufficiently large to permit retention of the treated water within it for periods up to four hours or more to allow time for the depositing of these flocs. Necessarily, the flocculating apparatus and the sedimentation chamber have to be of large size and are expensive to build and to operate. In the softening of water the situation is the same. Heretofore established practice has been to gently stir the raw water after mixture with softening chemicals, such as lime or lime-soda, for long periods, followed by long detention in a sedimentation compartment. The velocity of the agitator paddles and the length of time required for the process are comparable to that of removing turbidity by coagulation.

A more recent development in the art is disclosed in the patents to Walter J. Hughes, Nos. 2,245,587 and 2,245,588. The Hughes inventions provide a method of treating liquid by maintaining the particles formed in the treatment against sedimentation at all times and in all parts of the apparatus during operation, clear water being caused or allowed to escape directly from the surface of the slurry and solids being discharged to waste by withdrawing slurry. These inventions provide for continuously recirculating particles formed in previous treatment through the mixing and reaction zone in which the raw liquid is being reacted with chemicals. This process is much more rapid and secures much better results than the prior art. The Hughes process carefully avoids sedimentation. It is necessary to provide in the Hughes apparatus a means for removing from the slurry the excess of solid particles formed therein and for subsequently removing such solid particles from the treatment system. In the operation of liquid treatment works, such as water softening plants, water clarification plants, and the like, operating under the Hughes invention, it has been discovered that the removal of the excess solids occasionally presents a very complex and troublesome question. One aspect of the present invention relates to removing the particles so formed from the water in a more simple and direct manner.

In both the old art and the Hughes process the handling of solids removed from water is very important. This is particularly true in the Hughes process, as under that invention it is possible to treat exceedingly large amounts of water in a relatively short time and in a relatively small tank. By means of my invention I am able to provide a new method of water treatment which retains the good points of both systems while overcoming difficulties inherent in each, and which requires a smaller and relatively less expensive apparatus than either. It is one of the purposes of my invention to provide apparatus and a method for the formation in one zone of relatively large, heavy and tough particles not requiring the careful handling necessary in flocculation, for the flowing of the liquid still containing suspended solids from said first zone into a quiescent sedimentation zone, and the separating of water and solids in the last mentioned zone.

I am aware that heretofore solids that have been deposited in a settling zone have been returned to a mixing or flocculation zone so as to provide a greater accumulation or quantity of solids there as an aid to flocculation. I am aware, also, that water containing more or less flocculated particles has been caused to flow upwardly through a layer of solids to secure some filtering or agglomerating effects. My observation and experience is that such methods do not give the results of the present process, but instead may actually cause cloudy water or delay sedimentation because of a disintegration of particles under the conditions of such operation.

Briefly, my invention, when considered as a process, comprises forming in a first step the solids to be removed from the water into particles that are much denser and also tougher, although they are not necessarily larger, than those of the common flocculation process; and in a subsequent step the rapid clarification of the water due to the quick subsidence of these heavy particles.

My invention comprises further as a process the way in which the dense particles are formed, and also the retention of particles for a considerable period in a first part of the process. While there is a continual entry or formation of particles in the water entering a first step and a continual forward migration of particles and a continual carrying out of particles by the water leaving this step and entering the sedimentation zone, the solids carried to the sedimentation zone by a given portion of water are not necessarily or ordinarily those entering with, or formed in, such portion but those that have been retained in suspension in the first step for a period, which may be and often is several hours depending somewhat on the character of the water being treated. During the period of retention the particles are prepared for subsequent rapid settling under and by conditions contrary to the accepted teachings and practice of the art of coagulation. My invention comprises also apparatus providing for the successive steps referred to and for the maintenance of the necessary conditions in each step.

Preferred embodiments of the apparatus of the present invention are shown in the accompanying drawings which form a part of this specification, and in which like reference characters in the several figures designate similar elements.

Figure 1 is a vertical sectional view of a preferred embodiment of my invention.

Figure 2 is a plan view of the embodiment shown in Figure 1.

Figure 3 is a vertical cross-sectional view of another embodiment of my invention.

Figure 4 is a plan view of the modification shown in Figure 3.

The embodiment of my invention shown in Figures 1 and 2 comprises a relatively shallow tank 10 defined by the end walls 11 and 12 and the side walls 13 and 14. At one end, such as adjacent the end wall 11, is located a slurry formation, retention and circulation chamber 15, preferably circular in shape and defined by the end wall 11, and an arcuate partition 16. This partition 16 divides the tank 10 into the slurry reaction chamber 15, in one end of the apparatus, and a sedimentation chamber 17. An overflow launder 18 separated from the sedimentation chamber 17 by weir 19 and communicating with the treated water effluent conduit 20 is provided at the other end of the tank 10.

The partition 16 separating the slurry and reaction chamber 15 from the sedimentation chamber 17 terminates at a level 21 below that of the top of weir 19, so that water may non-turbulently overflow from the slurry chamber 15 into the settling compartment 17. I prefer to place an annular launder 22, defined by the wall 23 and the substantially horizontal floor 24, so that water may overflow from the slurry formation, retention and circulation compartment 15, all around its circumference. It should be obvious that this launder could be eliminated by raising the end wall 11, but this would permit the overflow of treated water only from a portion of the slurry chamber.

I prefer that the tank 10 be provided with a steeply sloping floor 25 in the arcuate section of the sedimentation chamber 17 adjacent the slurry chamber 15. The slope should be steep enough to permit solids settling thereon to slide into a transverse solids sump 26, which I prefer to locate immediately adjacent the partition 16 enclosing the slurry reaction chamber. The balance of the floor 27 of the sedimentation compartment 17 preferably slopes gradually from the outlet end 12 to the solids sump 26. The floor 28 of the slurry chamber preferably is substantially horizontal.

Within the slurry reaction chamber 15 I provide baffle means 30 for defining a closed fountain type of circulation in the lower portion of the mixing and reaction tank. Various arrangements of the baffles can be made, but I suggest one of the type shown in Figure 1, which comprises a truncated conical hood 31, with an outlet opening 32 at the top. The hood 31 is spaced a short distance above the bottom 28 of the slurry chamber 15 by suitable supports, such as legs 33 and 34. Attached to the lower edge of the conical hood 31 is a short vertical skirt 35. Placed above the outlet opening 32 of the conical hood is a baffle 36 for directing water issuing from the hood outwardly and downwardly. I prefer to place a relatively small cylinder 37 above the center of the baffle 36 in order to provide a well for the shaft hereinafter described. This tube 37 should extend above the water level of the tank in order to prevent flow of water therethrough into the upper portion of tank 10. I prefer to place a plurality of vertical baffles, such as 38 and 39, between the conical hood 31 and the baffle 36. These baffles 38 and 39 diminish the rotary movement of water issuing from the outlet 32 at the top of the conical hood 31.

Within the tube 37 and hood 31 I place a shaft 40, the lower end of which is journaled in bearing 41. The upper end of the shaft is connected to a motor and speed reducer 42 supported above the tank by any suitable means, such as bridge 43. Rigidly affixed to the shaft 40 is a relatively large impeller 44 and a plurality of agitating bars 45. The motor and gear reducer should be adapted to rotate the shaft, together with the impeller and agitating bars at a relatively high speed, when considering the art of softening or clarifying water. The maximum speed permitted by prior practice of coagulation or flocculation was a peripheral speed of two or two and a half feet per second. If this rate was exceeded the flocs were broken up into extremely light and small particles and were more difficult to settle than if no mixing had been used. I prefer to use a peripheral speed of from five to ten feet per second, although fifteen or more is not excessive. Preferably the speed of the impeller should be such as to provide for a complete passage of all the slurry in the zone of circulation under and around the hood 31 in about five minutes or less.

Preferably the walls of the reaction chamber 15 will slope inwardly adjacent the bottom, as at 46. The chamber 15 should also be provided with a drain 47 equipped with a valve 48 so that this chamber can be completely drained when desired. As will be apparent from the figures and from the description, the conditions existing in the bottom of the reaction and conditioning chamber 15 are similar to those in the bottom of the Hughes apparatus, but whereas Hughes permits clarified water to rise from the slurry and to fill the top of his apparatus, the applicant in the present invention completely fills the reaction and conditioning chamber 15 with slurry, so that the treatment of the water and the conditioning of the slurry continues in the space above the circulation to the top of that chamber, and as excess solids accumulate they overflow the wall of this chamber with the water which passes to the sedimentation zone.

Raw water is introduced into the apparatus through raw water inlet 49, discharging beneath the hood 31 as through lateral opening 50. The chemical treating reagent is introduced through chemical feed line 51, likewise beneath the hood 31 and preferably removed from the raw water inlet so that the chemicals may be mixed with the slurry prior to contacting the water to be treated. However, in many instances the water and reagent may be mixed together prior to discharge within the hood. In other instances the water inlet 49 and the chemical inlet 51 may be adjacent to each other so that they are separately introduced into the circulating slurry, and are mixed with the slurry together rather than separately. In some instances it is desirable to aerate the liquid undergoing treatment, which can readily be done by any suitable means, such as air diffuser 52 terminating in the chamber 15 and connected to a blower, not shown. This serves to aerate the slurry and solids within the chamber 15 for biological, chemical or purely physical treatment of the liquid and suspended solids.

The sedimentation chamber is preferably provided with some mechanical means for scraping sludge depositing upon the sloping bottom 27 thereof into the transverse sludge sump 26. Many such devices are known, but in the drawings I have shown a common type comprising a plurality of scraping blades 53 affixed to two endless chain conveyers 54. The chains 54 are carried by a plurality of sprockets, such as 55, 56 and 57. One set of sprockets, such as 55, are preferably rigidly affixed to a shaft 58, connected to a motor and suitable reducing gears 59. The scrapers 53 are, of course, moved downwardly along the floor of the sedimentation chamber 17 from right to left very slowly in order to push sedimented solids to the sump 26, without agitating the liquid in the compartment. Solids collecting in the sump are blown off through solids outlet 60, which is provided with a suitable valve 61.

The operation of the apparatus disclosed in this embodiment will be readily understood. Water is introduced through line 49 and chemicals through line 51. The motor 42 is started, causing rapid rotation of the shaft 40 and the impeller 44 and agitating bars 45 attached thereto. This provides a turbulent mixing of water and chemicals under the hood 31, and as the water rises it is given an upward movement through the hood outlet 32 at the top of the hood 31 and directed outwardly by the baffle 36. Preferably the amount of water circulated by the impeller 44 is several times that of the throughput of raw water so that the major portion of the flow issuing from beneath the baffle 36 will pass over the top of the hood 31 downwardly along the skirt 35 and return to the impeller under the hood 31, where it is again circulated as above described. As previously indicated the impeller must rotate rapidly, preferably at peripheral speeds of approximately five to ten feet per second, although higher speeds are often acceptable. The speed should be sufficient to provide a compete recirculation of liquid in the zone of circulation under and around hood 31 in about five minutes or less. In my invention it is necessary that the mixing be turbulent and the circulation rapid. This results in the formation of tough dense particles rather than the fragile and light flocs produced by the gentle agitation of the old style flocculating processes. This type of solid particle readily sediments in the quiescent settling chamber 17. As water rises in the tank a throughput portion will, of course, overflow the upper edge 21 of the slurry formation and circulation chamber 15 and flow into the sedimentation compartment 17. The considerable turbulence and rapid flow of liquid in the closed fountain circulation at the bottom of the slurry chamber 15 rapidly builds up a heavy slurry of relatively dense particles which are prevented from sedimenting therein by the turbulent mixing and rapid circulation. This dense slurry tends to remain in the bottom of the mixing and reaction zone until a point of saturation is reached, whereupon the excess solid particles will, as accumulation takes place, be displaced upwardly into the space over the circulation zone, and finally flow with water over the upper rim 21 of the mixing and reaction tank. The slurry particles so formed and overflowing with water from the slurry chamber 15 are much more dense than the floc prepared heretofore. These particles, therefore, readily settle in the sedimentation compartment 17. The complete sedimentation of solids so formed can be accomplished in a period of the order of about thirty mnutes as contrasted with usual sedimentation times of two to four hours, or even more, and the flow of treated water through the sedimentation compartment 17 can be quite high. As the solids collect in the sedimentation chamber 17 they either slide down the steeply sloping portion of the floor 25 or are scraped along the other portion of the floor 27 by the scrapers 53 to the sump 26, from whence they can readily be removed from time to time.

The embodiment of my invention shown in Figures 3 and 4 operates in essentially the same manner as that shown in Figures 1 and 2. In the embodiment shown in Figures 3 and 4 the apparatus comprises a circular tank 100 defined by the side wall 101 and the substantially flat horizontal bottom 102. The tank is provided with a peripheral effluent launder 103 adjacent the upper rim 104 of the tank 100. Purified water is withdrawn from the launder 103 by any suitable means, such as a pipe 105.

The tank 100 contains an inner slurry forming and circulation compartment 106 confined by the wall 107 concentric with the outer wall 101 of the tank 100. The upper edge 108 of the inner wall 107 should preferably be somewhat below the rim 104 of outer tank 100, so that liquid overflowing the wall of the chamber 106 will be sufficiently far from the upper rim 104 to permit complete clarification or separation of the solids and liquids within the outer settling compartment 109.

As in the embodiment shown in Figures 1 and 2, the mixing and reaction compartment is provided with a concentric conical hood 31 open at the top, as at 32, and surrounded by a skirt 35 at its lower edge. The hood is supported a short distance above the floor 102 of the tank by any suitable means, such as legs 33 and 34. Coaxially aligned within the hood is an agitating and flow impelling mechanism comprising shaft 40 journaled in bearing 41, located on the floor of the tank and attached at its upper end to motor and speed reducer 42, supported above the tank by any suitable means, such as bridge 43. The shaft 40 is provided with a stream projecting impeller 44 and a plurality of agitating bars 45. In spaced relationship above the conical hood 31 is a deflecting baffle 36 adapted to direct the flow issuing from the open top 32 of the hood 31, laterally and downwardly, and a cylinder 37 surrounding the shaft 40. It is also preferable to supply a plurality of baffles 110 to prevent rotary movement of the liquid in the upper portion of the slurry reaction chamber 106. It is obvious that these may be placed between the hood and baffle as is shown in Figures 1 and 2, or they may be placed adjacent the upper rim 108 of the slurry formation, retention and circulation chamber 106, and extending radially from the baffle 36 to the chamber wall 107. It is desirable that water overflowing the wall 107 of the slurry chamber should be free from rotary or turbulent motion.

Water to be treated is discharged through line 49 and vertical discharge opening 50 within the hood 31. Chemicals needed for treating the water can be introduced through line 51.

In order to avoid deposits within the chamber 106 and to assist in the closed fountain type of circulation therein, it is desirable that the lower portion of the wall 107 be sloped inwardly, as at 46. It is also desirable to supply a drain 47, provided with a valve 48, so that if necessary the entire apparatus can be closed down and all of the liquid drained therefrom.

The outer concentric sedimentation chamber 109 is provided with a sludge sump 26, equipped with a sludge discharge line 60, provided with a valve 61, whereby sludge can be withdrawn from time to time. I also provide means for scraping solids sedimenting on the floor of the sedimentation chamber 109 to the sludge sump. Any well known means can be used, but by way of illustration I show a scraper 111 suspended from a carriage 112 by means of hangers 113. The carriage 112 comprises a frame 114 rising above the liquid level fixed by the rim 104, so as to support a driving motor 115 above the level of the liquid in the tank 100. The carriage is supported by wheels 116, which ride upon rails 117, supported by suitable brackets, such as 118 and 119, affixed to walls 101 and 107, respectively. A sprocket 120 is affixed to the rotor of motor 115 and is connected to a similar sprocket 121 on the axle 122 of carriage 112 by means of a chain 123. Obviously, the operation of the motor 115 will drive the carriage 112 around the concentric sedimentation chamber 109, thereby scraping sedimented solids along the floor thereof to the sump 26, from whence they may be discharged from time to time.

The apparatus of the type disclosed in the embodiment illustrated in Figures 3 and 4 is particularly adaptable to those installations in which it is desired to use a preexisting clarifying chamber with a minimum of alteration. Its operation is sufficiently similar to that of the embodiment shown in Figures 1 and 2 to be readily understood without further description.

It will be evident that the size of the apparatus of my invention will depend upon the quantity and type of liquid to be treated, or on the quantity and nature of the solids naturally present or formed therein. However, in view of the fact that the turbulent agitation and circulation of liquid to be treated with the chemical reagent and the slurry of solid particles precipitated from previously treated liquid results in the formation of very dense, or even granular particles, it is evident that the clarification chamber can be of comparatively small size. Also, due to the rapid circulation of liquid in the slurry chamber, that chamber likewise can be relatively small. It is, therefore, possible by means of my invention to treat relatively large volumes of liquid, such as water, in relatively small apparatus.

It is also evident that by means of my invention it is possible to treat water much more rapidly than heretofore. In the flocculation process the customary mixing time is from thirty to sixty minutes as compared to a maximum of about fifteen in my apparatus. The customary period of sedimentation in the flocculation process is from two to four or six hours, while I can achieve comparable results in periods of thirty minutes or less. This is due to the fact that the turbulent agitation and rapid circulation of major quantities of slurry with minor quantities of water produces an entirely different type of solid particle. In the old flocculation process the particles were light and delicate, while those produced in my process are tough and dense. In the softening of water, for example, I get a hard crystalline particle, while under former processes the precipitate was a loosely held aggregation of minute fluffy particles which disintegrated at the slightest provocation.

It is desirable that the incoming raw water be mixed with two or three times its own volume of slurry and that it be recirculated three or more times through the turbulent mixing zone. It is also necessary that the solid particles be maintained in suspension until they are carried into the sedimentation chamber, as I have found that resuspended settled particles are not as suitable for the reaction as those maintained in suspension. The term "slurry" is used herein and in the claims which follow, in the sense it is coming to be used in the art, namely, as designating a suspension of water being treated and a quantity of solids accumulated from previously treated water several times greater than that in, or formed in, an equal quantity of raw water entering to be treated.

Manifestly, many modifications and variations of the invention hereinbefore set forth may be made by persons skilled in the art without departing from the spirit and scope hereof.

I claim:

1. Liquid treating apparatus of the type wherein the liquid is treated in and by a slurry comprising in combination a solids conditioning chamber and a laterally adjacent sedimentation chamber, a partition structure within said solids conditioning chamber extending upwardly therein and dividing said chamber into a mixing and reaction zone extending into the lower portion of said chamber and a relatively quiescent zone extending into the upper portion of said chamber, a mechanical stream projecting impeller within said mixing and reaction zone so constructed and positioned as to cause a vertical flow of liquid in said zone, a prime mover for rotating said impeller, means for delivering liquid to be treated and a chemical reagent into said solids conditioning chamber, a constantly open hydraulic communication from the upper portion of the quiescent zone into the sedimentation chamber, an outlet for treated liquid leading from an upper portion of said sedimentation chamber, and an outlet for solids leading from adjacent the bottom of said sedimentation chamber.

2. In combination in water treating apparatus of the type wherein water is treated in and with a slurry, a solids conditioning chamber and laterally adjacent sedimentation chamber, a mechanically driven stream projecting impeller mounted in said solids conditioning chamber, said impeller being of a type and so positioned as, on rotation thereof, to impart a vertical flow to water in said chamber, a partition structure in said solids conditioning chamber enclosing said impeller and having an opening adjacent the bottom of said tank and a second opening adjacent the top of said partition, a deflecting baffle spaced from said second opening and so constructed and arranged as to direct the flow issuing from said second opening downwardly along said partition, means for delivering a reagent into the lower part of said conditioning chamber, means for delivering water to be treated into the lower part of said conditioning chamber at a point removed from the point of entry of the reagent, a slurry outlet from the upper portion of said conditioning chamber into said sedimentation chamber, an outlet for treated water from the upper part of said sedimentation chamber, and an outlet for settled solids from the lower part of the said sedimentation chamber.

3. Liquid treating apparatus of the type wherein there is maintained a pool of slurry in and by which the liquid is treated, comprising a solids formation and conditioning chamber and a laterally adjacent seidmentation chamber; a conical partition structure within said solids formation and conditioning chamber separating that chamber into a mixing zone in communication with the lower portion of said chamber and a zone of relative quiescence in the upper portion of said chamber; an outlet from the upper portion of said conical partition structure; a deflecting baffle above said outlet; means including a mechanical stream projecting impeller in said mixing zone and a prime mover for imparting a circulation of sufficient velocity and turbulense through said mixing zone to maintain solid particles in liquid therein in suspension; separate means for introducing water and a particle forming substance into the mixing zone; a passage for the flow of liquid from the upper portion of said quiescent zone into said sedimentation chamber; an outlet for treated liquid leading from the upper portion of said sedimentation chamber, a pocket in the floor of said sedimentation chamber, means for impelling solids settling on the floor of said sedimentation chamber to said pocket, and an outlet for solids from said pocket.

4. Liquid treating apparatus of the type wherein there is maintained a pool of slurry in and by which the liquid is treated which comprises a tank; a clarified water outlet from the upper portion of said tank; a vertically extending partition within said tank removed from said clarified water outlet, terminating below the level of said outlet and dividing the space within the tank into a solids conditioning chamber removed from said outlet and a sedimentation chamber adjacent said outlet; means in said solids conditioning chamber for forming and maintaining as a slurry liquid undergoing treatment and solids accumulated from previously treated liquid, said means comprising a shaft extending into said solids conditioning chamber, a liquid impeller mounted on said shaft and so positioned in said chamber as to impel liquid vertically therein, and means to rotate said shaft; an upwardly extending baffle structure in said solids conditioning chamber so constructed and arranged as to laterally enclose said impeller, an outlet from the upper portion of said baffle structure, a deflecting baffle above said outlet and members associated with said deflecting baffle and so positioned as to diminish rotational movement of liquid in the upper part of said conditioning chamber; separate means for introducing water and a particle forming substance into said conditioning chamber; and means in said sedimentation chamber for collection of sedimented solids and discharging of same to waste.

5. Liquid treating apparatus comprising a circular tank, a treated liquid outlet from the upper portion of said tank, a vertically extending partition within said tank substantially concentric to the wall of said tank, terminating at a level below that of said liquid outlet, and dividing the tank into an inner solids conditioning chamber and an outer sedimentation chamber; a sloping partition structure within said solids conditioning chamber dividing said chamber into a mixing and reaction zone in the lower portion of said chamber and a quiescent zone in an upper part of said chamber, a mechanical stream projecting impeller in said mixing zone for turbulently circulating liquid through said mixing zone, a prime mover for rotating said impeller, means for delivering a chemical reagent into said mixing zone, means for delivering liquid to be treated into said mixing zone at a point removed from the point of delivery of the chemical reagent thereto, and means for withdrawing sedimented solids from the lower part of the said sedimentation chamber.

6. The apparatus of claim 1 wherein the prime mover is so joined to said impeller as to impart a peripheral speed to said impeller of substantially five feet per second or more.

7. The apparatus of claim 1 wherein the partition and the impeller are so constructed and arranged as to provide for a circulation of the entire liquid within the mixing zone at least once in each five minute period.

8. In the treating of water by a process wherein raw water is treated in and with a slurry containing particles separated and accumulated from previously treated water, the steps which comprise first conditioning said particles for sedimentation by maintaining a pool of slurry, circulating a major portion of said slurry in a path including a mixing zone and leading from and returning to the lower portion of such pool, imparting substantial impelling energy to said slurry to maintain said circulation through said path, mixing together in said mixing zone, a minor amount of raw water, a chemical reagent and a major amount of said circulating slurry, and displacing an amount of slurry from the upper portion of said pool equivalent to the input of raw water, and thereafter clarifying the displaced slurry in a quiescent laterally adjacent sedimentation zone, withdrawing treated water from the upper portion of said sedimentation zone, and withdrawing sedimented solids from the lower portion of said sedimentation zone.

9. In the treatment of water by the process which includes treating the water with a reagent in a slurry containing particles separated and accumulated from previously treated water, the steps which comprise establishing a body of water undergoing treatment, forming in said body of water a solids formation and conditioning zone and a laterally adjacent quiescent sedimentation zone, maintaining in the lower portion of the solids formation and conditioning zone a pool of slurry containing suspended particles separated from previously treated water, applying substantial mechanical propelling energy to said slurry to provide a rapid and turbulent circulation thereof which includes passing such slurry from one portion of said pool through a mixing and reaction zone to another level in said pool and back to said first portion of said pool, whereby the entire contents of the pool of slurry is repeatedly passed through the mixing and reaction zone, separately passing a chemical reagent and raw water into said mixing zone, mixing said reagent and water in said mixing zone with a quantity of said slurry of the order of two times or more the volume of said reagent and water whereby particles are formed in said slurry and conditioned by the combined effects of precipitation, agitation and accumulation, displacing an output quantity of slurry upwardly from said pool through a superimposed semi-quiescent zone and thence laterally into said quiescent sedimentation zone, separating water and suspended solids in said sedimentation zone, withdrawing clarified treated water from the upper portion of said sedimentation zone, and withdrawing separated solids from the lower portion of said sedimentation zone.

10. Liquid treating apparatus comprising a solids conditioning chamber and a laterally adjacent sedimentation chamber, a passage for flow of liquid from the upper portion of said solids conditioning chamber into the sedimentation chamber, mechanically driven agitating and circulating means in the lower portion of said solids conditioning chamber, baffle means within said solids conditioning chamber above said agitatng and circulating means and below said passage and so constructed and arranged as to still the circulating liquid, means for delivering liquid to be treated and a chemical reagent into said solids conditioning chamber, an outlet for treated liquid leading from the upper portion of said sedimentation chamber and an outlet for solids leading from the lower part of said sedimentation chamber.

WALTER H. GREEN.